Jan. 14, 1958 J. G. LINVILL 2,820,155

NEGATIVE IMPEDANCE BISTABLE SIGNAL-OPERATED SWITCH

Filed March 9, 1955

INVENTOR
J. G. LINVILL
BY Harry C. Hart
ATTORNEY

United States Patent Office 2,820,155

Patented Jan. 14, 1958

2,820,155

NEGATIVE IMPEDANCE BISTABLE SIGNAL-OPERATED SWITCH

John G. Linvill, Whippany, N. J., assignor to Bell Telephone Laboratories, Incorporated, New York, N. Y., a corporation of New York Application March 9, 1955, Serial No. 493,247

21 Claims. (Cl. 307—88.5)

This invention relates to signal-carrying signal-operated switching devices.

Many situations arise in communications technology in which it is required that the presence of a signal act to establish a low-impedance path for that signal, or a related one, between its source and a load. An important situation of this sort is found in a crosspoint switching network, a component of great and growing utility in the telephone switching art. The function of such a network is to establish a voice current path between one of a number of incoming conductors and one of a number of outgoing conductors under the influence of a marking signal which appears on the incoming conductor. To this end it is common to provide a number of like devices, each one interconnecting one incoming conductor of the net with one outgoing conductor and located at the crosspoint which is specified by those conductors.

Such a crosspoint switch should ideally present substantially infinite impedance when the switch is "open," should have a voltage threshold, represented by a peak in its current-voltage characteristic, such that when the incoming signal exceeds this threshold, the switch trips into its closed condition, and should have a negative resistance domain, represented by a negatively sloping portion of the current-voltage characteristic, separating the threshold from the closed condition. Furthermore, the lowest possible value for the variational impedance presented by the switch in its closed condition has generally been considered to be desirable. The prior art contains many circuit arrangements designed with these ideal characteristics in mind and whose performance approximates them.

The present invention is based on the recognition that the accepted ideal characteristic is not in fact the best one. Rather, it envisages a characteristic having a negatively sloping portion in the closed position. This negative slope must, of course, be less than the negative slope of the intermediate portion of the characteristic which makes for instability and promotes trigger action. It may readily be adjusted to be less than the positive resistance of the associated circuit, so that the switch and its load taken together are stable when the switch is in the closed condition. At the same time it furnishes a substantial amount of effective gain and hence reduces the amount of gain which might otherwise be required in the associated line.

To secure this desirable characteristic, advantage is taken of the fact that in any device of the type described a characteristic is already at hand having a steeply sloping portion of negative sign. By the connection of a breakdown diode in appropriate fashion to a suitable circuit element of the switching device, and by the selection of such breakdown diode to have a breakdown voltage of suitable magnitude, a sharp break or knee may be introduced into the negatively sloping portion of the characteristic at a suitable point thereof, to one side of which the negative resistance is so great as to permit trigger action while to the other side of this point the negative resistance is insufficient to make for instability but makes, on the other hand, for gain in the closed position.

The invention will be fully apprehended from the following detailed description of a preferred illustrative embodiment thereof taken in connection with the appended drawings in which.

Figure 1:
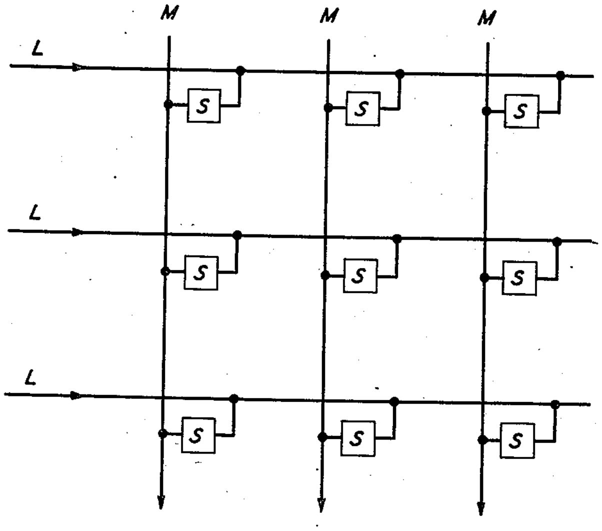
Fig. 1 is a schematic circuit diagram showing a crosspoint switching network.
Figure 2:
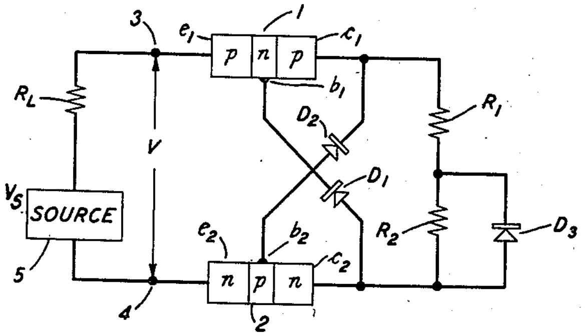
Fig. 2 is a schematic circuit diagram illustrating an embodiment of the invention.

Referring now to the drawings, Fig. 1 illustrates a crosspoint switch network in which each of the devices S interconnecting one horizontal conductor L with one vertical conductor M may be a signal-operated switch. While many devices are known which may serve in the combination of Fig. 1, the invention will be illustrated as applied to a particular one of such devices as shown in Fig. 2. It comprises a first transistor 1 of one conductivity type, for example N-type, and a second transistor 2 of opposite conductivity type, for example P-type. Each of these transistors is of the junction variety, e. g., the variety described in Shockley Patent 2,569,347, whose current multiplication factor $\alpha$ lies between one-half and one, preferably between 0.6 and 0.9. Two series resistors $R_1$ and $R_2$ interconnect the collector electrodes $C_1$, $C_2$, of the two transistors. A first breakdown diode $D_1$ interconnects the base electrode $b_1$ of the first transistor with the collector electrode $C_2$ of the second transistor and a second breakdown diode $D_2$ interconnects the base electrode $b_2$ of the second transistor with the collector electrode $C_1$ of the first transistor. A third breakdown diode $D_3$ is connected in parallel with the resistor $R_2$.

Accessible terminals 3, 4 are connected to the emitter electrodes of the two transistors 1, 2, and these in turn may be connected in series with a signal source 5 and a load $R_L$. No power source is required, all the power necessary to operate the switch being derived from the signal source 5.

Each of the breakdown diodes $D_1$ and $D_2$ may be a so-called Zener diode, namely a semiconductor junction device having the characteristic that beyond a critical applied reverse voltage the current through the device is substantially independent of the voltage across it. For reverse voltages below this critical voltage, the diode presents a very high impedance, while for forward voltages its impedance is very low. Such elements are described by Pearson and Sawyer in the Proceedings of the Institute of Radio Engineers for November 1952 (volume 40, page 1348) and in Shockley Patent 2,714,702, granted August 2, 1955, on application Serial No. 211,212, filed February 16, 1951.

As described in the aforementioned publication and patent, such elements can be fabricated to have a critical reverse voltage of practically any desired magnitude.

While the diodes $D_1$ and $D_2$ need not have like breakdown thresholds, nothing is gained in the present connection by unlikeness of breakdown threshold, and for the sake of simplicity of description the breakdown thresholds of these two devices will hereinafter be treated as alike, and of magnitude $V_{bd}$.

It is to be noted that the diodes $D_1$ and $D_2$ are poled in opposite senses with respect to the transistor electrodes, each being connected for forward conduction in the direction of the arrowhead which represents it. The normal base electrode current of an N-type transistor whose current gain is less than unity is outward from the base electrode, while the normal base electrode current of a P-type transistor whose current gain is less than unity is inward to the base electrode. Thus, each of these diodes $D_1$ and $D_2$ is poled for forward conduction of transistor base electrode current in a direction opposite to that of its normal flow.

Disregarding, for the present, the diode $D_3$ and its function, the operation of the circuit of Fig. 2 is as follows: For zero or small voltages applied between the emitter electrodes of the two transistors in the direction shown, i. e., from the emitter $e_2$ of the P-type transistor 2 positively toward the emitter $e_1$ of the N-type transistor 1, the base electrodes $b_1$, $b_2$, of the transistors are prevented from carrying current by the fact that each of them has in series with it a breakdown diode biased in its reverse direction, in which case the input resistance of the transistor is exceedingly high. This condition continues until the applied voltage V, which is equal to the voltage $V_s$ of the source 5, diminished by the voltage drop across the load resistor $R_L$, reaches a threshold value $2V_{bd}$, equal to the sum of the breakdown voltages of the diodes $D_1$ and $D_2$. When this threshold value is exceeded, the diodes $D_1$ and $D_2$ break down and present negligible variational resistance. The two transistors and the low resistance cross-coupling paths between them now constitute, in effect, a negative impedance converter of (negative) conversion factor $1-2\alpha$ to whose output terminals resistors $R_1$ and $R_2$ are connected in series. Hence, neglecting the effects of emitter resistance and base resistance, which are small, the negative impedance seen at the input terminals of this converter is $$(2\alpha-1)(R_1+R_2)$$

Negative impedance converters employing transistors in this fashion are described, and the negative conversion factor $1-2\alpha$ is derived, in an article by J. G. Linvill, published in the Proceedings of the Institute of Radio Engineers for June 1953, volume 41, page 725. They are also described in United States Patent 2,726,370 granted December 6, 1955, on an application of J. G. Linvill and R. L. Wallace, Jr., Serial No. 310,084, filed September 17, 1952.

Figure 3:
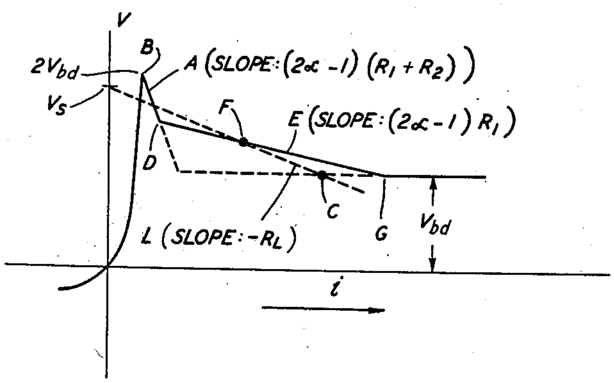
Fig. 3 shows the voltage-current characteristic of the circuit of Fig. 2.

As shown in Fig. 3 this negative impedance is represented by a negative sloping portion A of the voltage-current characteristic of the switch which separates the threshold peak B from the low-impedance "closed" circuit condition of the switch. This negative sloping portion of the characteristic represents an unstable condition for the network. Accordingly, as the source voltage continues to rise and the voltage applied to the input terminals 3—4 of the network exceeds that of the peak B of the characteristic, a switching transient commences.

As the switching transient proceeds to completion, and in consequence the voltage between the input terminals of the switch falls, a condition is ultimately reached in which the voltage between the collector electrode of each transistor and its base electrode is sensibly equal to zero, the direct voltage across the input terminals is equal to $V_{bd}$, and the variational resistance presented by the switch is negligible. This is the closed circuit condition, represented by the broken portion of the curve of Fig. 3. The negligible variational resistance is reflected in the horizontal character of this portion of the characteristic. Operation, with a source 5 of voltage $V_s$ and a load $R_L$, takes place at the intersection of a load line L with this horizontal portion of the characteristic; i. e., at the point C. The projection of the horizontal portion intersects the steeply rising initial portion of the characteristic at a point where its resistance is exceedingly high, indeed almost infinite. Hence, the establishment of a circuit path of low variational impedance between the two switch terminals 3, 4, is not accompanied by leakage through any of a number of similar switches which may be connected in parallel.

In accordance with the present invention, a more desirable characteristic may be secured by the introduction of a breakdown diode into an appropriate point of the circuit of such a switch. In the particular illustration it is thus a third breakdown diode $D_3$. It is introduced in a fashion to establish, by virtue of its breakdown, a shunt across a selected portion of the resistance which determines the slope of the trigger action-promoting negative resistance. In particular, this resistance being constructed of the two series resistors $R_1$ and $R_2$, the breakdown diode $D_3$ shunts the resistor $R_2$. Hence, when in the course of the transient operation of the switch, the voltage across the two resistors has risen to a certain value, to be detailed below, the characteristic breaks; e. g., at the point D, and the slope of the straight line portion E beyond the break D corresponds to the negative resistance which remains, namely, to $(2\alpha-1)R_1$. The portion E of the characteristic having this slope is now the "closed" working portion of the curve, and the "closed" operating point is indicated at F. The straight line character of the working "closed" portion means that the switch does not introduce distortion into currents which pass through it. The breakdown voltages of diodes $D_1$ and $D_2$ operate as before to determine the voltage of the peak B of the curve, and also to introduce a second break G in the characteristic between the working "closed" portion E of the characteristic and a third horizontally extended portion of zero slope. However, in practice it is contemplated that the resistor $R_1$ will be chosen in relation to that of the load applied to the switch so that $(2\alpha-1)R_1<R_L$. Hence, operation on a point such as the point F of the straight gently sloping portion E of the characteristic is stable, and the second break G is thus normally never reached.

The breakdown voltage $V_{bd3}$ of the diode $D_3$ should be of the order of one-quarter of the breakdown voltages of the diodes $D_1$ and $D_2$; i. e., one-eighth of the threshold voltage for the circuit as a whole.

A simple circuit analysis shows that the input voltage on the switch at the first break is given by $$V=2V_{bd}-\frac{(R_1+R_2)}{R_2}V_{bd3}$$

When $R_1$ and $R_2$ are alike in magnitude and $V_{bd3}$ is one-quarter $V_{bd}$, the input voltage V for the first break falls at three-quarters of the peak voltage amplitude, a convenient value.

What is claimed is:

1. A two-terminal bistable signal-operated apparatus for connection between a signal source and a load and adapted to isolate said source from said load for signal voltages less than a preassigned threshold and to establish a low-impedance signal path from said source to said load in response to a signal voltage in excess of said threshold, which comprises a negative impedance converter having two input terminals adapted to be connected to said source and to said load, two output terminals, two positive resistance elements connected in series between said two output terminals, means for disabling said converter for signal voltages less than said preassigned threshold, and means for effectively removing one of said two resistors when the voltage across it exceeds a second preassigned threshold.

2. Apparatus as defined in claim 1 wherein the means for effectively removing one of said two resistors comprices a rectifier connected in parallel with said resistor.

3. Apparatus as defined in claim 2 wherein said last-named rectifier is a junction breakdown diode.

4. Apparatus as defined in claim 3 wherein said last-named rectifier is selected to have a breakdown voltage of the order of one-eighth of said preassigned threshold voltage.

5. Apparatus as defined in claim 1 wherein said negative impedance converter comprises two amplifying devices each of which has an input electrode, output electrodes and a common electrode, said input electrode being connected to said input terminals respectively, said output electrodes being connected to said output terminals respectively, and a cross-coupling path interconnecting the common electrode of each of said devices with the output electrodes of the other of said devices.

6. Apparatus as defined in claim 5 wherein each of said devices is a transistor.

7. Apparatus as defined in claim 6 wherein said transistors are of opposite conductivity types.

8. Apparatus as defined in claim 5 wherein each of said devices is a junction transistor.

9. Apparatus as defined in claim 5 wherein each of said devices has a current gain lying in the range 0.6–0.9.

10. Apparatus as defined in claim 5 wherein said disabling means comprises a rectifier connected in one of said cross-coupling paths.

11. Apparatus as defined in claim 5 wherein said disabling means comprises a rectifier connected in each of said cross-coupling paths.

12. Apparatus as defined in claim 11 wherein the means for effectively removing one of said two resistors comprises an additional rectifier connected in parallel with said resistor.

13. Apparatus as defined in claim 12 wherein said additional rectifier is a junction breakdown diode.

14. Apparatus as defined in claim 12 wherein said last-named breakdown diode is selected to have a breakdown voltage of the order of one-quarter of the breakdown voltage of either of said first-named diodes.

15. Apparatus as defined in claim 11 wherein said rectifiers are oppositely poled with respect to the common electrodes of said two devices.

16. Apparatus as defined in claim 15 wherein each of said rectifiers is poled to oppose the normal flow of current in the common electrode to which it is connected.

17. Apparatus as defined in claim 11 wherein each of said rectifiers is a breakdown diode.

18. Apparatus as defined in claim 17 wherein said breakdown diodes have like breakdown voltages.

19. Apparatus as defined in claim 17 wherein said breakdown diodes are selected to have the sum of their breakdown voltages equal to said first preassigned signal voltage threshold.

20. A two-terminal signal-operated apparatus for connection between a signal source and a load, and adapted to isolate said source from said load for signal voltages less than a preassigned threshold and to establish a low-impedance signal path from said source to said load in response to a signal voltage in excess of said threshold, which comprises a first transistor of one conductivity type and a second transistor of opposite conductivity type, each of said transistors having an emitter electrode, a collector electrode and a base electrode, two resistors connected in series between the collector electrodes of said transistors, a cross-coupling path interconnecting the base electrode of each transistor with the collector electrode of the other transistor, a breakdown diode connected in series in each of said paths, each of said breakdown diodes being poled to oppose the normal flow of current of the transistor base electrode to which it is connected, accessible terminals connected to said emitter electrodes, respectively, and a third breakdown diode connected in parallel with one of said two resistors.

21. A two-terminal signal-operated apparatus for connection between a signal source and a load, and adapted to isolate said source from said load for signal voltages less than a preassigned threshold and to establish a low, negative impedance signal path from said source to said load in response to a signal voltage in excess of said threshold, which comprises a first transistor of one conductivity type and a second transistor of opposite conductivity type, each of said transistors having an emitter electrode, a collector electrode and a base electrode, said transistors having like current amplification factors of magnitude $\alpha$, a first resistor $R_1$ and a second resistor $R_2$ connected in series between the collector electrodes of said transistors, a cross-coupling path interconnecting the base electrode of each transistor with the collector electrode of the other transistor, and accessible terminals connected to said emitter electrodes, respectively, whereby, for signal voltages within a preassigned range having exceeded said threshold, said apparatus presents at its accessible terminals a negative resistance of magnitude, greater than the resistance of said load, equal to $(2\alpha-1)(R_1+R_2)$, a breakdown diode connected in series in each of said cross-coupling paths, each of said breakdown diodes being poled to oppose the normal flow of current of the transistor base electrode to which it is connected, said diodes thereby acting to prevent the presentation of said negative resistance for signal voltages which have not exceeded said preassigned threshold, and a third breakdown diode connected in parallel with the second of said two resistors, whereby for signal voltages below said range, said apparatus presents at its accessible terminals a negative resistance of magnitude, less than the resistance of said load, equal to $(2\alpha-1)R_1$.

References Cited in the file of this patent

UNITED STATES PATENTS 2,655,609 Shockley -------------- Oct. 13, 1953

OTHER REFERENCES

Proceedings of the I. R. E., June 1953, vol. 41, "Transistor Negative-Impedance Converters," Linvill.

U. S. DEPARTMENT OF COMMERCE

PATENT OFFICE

CERTIFICATE OF CORRECTION

Patent No. 2,820,155

January 14, 1958

John G. Linvill

It is hereby certified that error appears in the printed specification of the above numbered patent requiring correction and that the said Letters Patent should read as corrected below.

Column 4, line 72, before "output" insert -- an --; line 73, for "electrodes" read -- electrode --; same line, for "electrode", second occurrence, read -- electrodes --; column 5, line 3, for "electrodes" read -- electrode --.

Signed and sealed this 29th day of April 1958.

(SEAL)

Attest:

KARL H. AXLINE

Attesting Officer

ROBERT C. WATSON

Commissioner of Patents